United States Patent
Mellot

(10) Patent No.: US 9,864,049 B2
(45) Date of Patent: Jan. 9, 2018

(54) METHOD FOR MEASURING A TIME OF FLIGHT

(71) Applicant: STMICROELECTRONICS (GRENOBLE 2) SAS, Grenoble (FR)

(72) Inventor: Pascal Mellot, Lans en Vercors (FR)

(73) Assignee: STMicroelectronics (Grenoble2) SAS, Grenoble (FR)

( * ) Notice: Subject to any disclaimer, the term of this patent is extended or adjusted under 35 U.S.C. 154(b) by 399 days.

(21) Appl. No.: 14/735,548

(22) Filed: Jun. 10, 2015

(65) Prior Publication Data

US 2016/0047904 A1 Feb. 18, 2016

(30) Foreign Application Priority Data

Aug. 18, 2014 (FR) ..................................... 14 57858
Mar. 20, 2015 (FR) ..................................... 15 52319

(51) Int. Cl.
*G01S 7/486* (2006.01)
*G01S 17/10* (2006.01)
*G01S 7/484* (2006.01)
*G01S 13/22* (2006.01)

(52) U.S. Cl.
CPC ............ *G01S 7/4865* (2013.01); *G01S 7/484* (2013.01); *G01S 7/4868* (2013.01); *G01S 17/10* (2013.01); *G01S 13/225* (2013.01)

(58) Field of Classification Search
CPC .... G01S 7/4865; G01S 7/4868; G01S 13/225; G01S 17/10; G01S 7/484
See application file for complete search history.

(56) References Cited

U.S. PATENT DOCUMENTS

| | | | |
|---|---|---|---|
| 4,049,953 A | 9/1977 | Evans, Jr. | |
| 4,569,599 A | 2/1986 | Bolkow et al. | |
| 5,262,837 A | 11/1993 | Shyy | |
| 6,137,749 A | 10/2000 | Sumner | |
| 6,292,062 B1 | 9/2001 | Bourk et al. | |
| 6,757,054 B2 | 6/2004 | Watanabe et al. | |
| 6,909,672 B2 | 6/2005 | Rao | |
| 6,958,639 B2 | 10/2005 | Park et al. | |

(Continued)

FOREIGN PATENT DOCUMENTS

FR 3024907 A1 * 2/2016 ........... G01S 7/4865

OTHER PUBLICATIONS

Maloberti et al., "Imcremental Sigma-Delta Modulators for 3D-Imaging: System Architecture and Signal Processing," IEEE Sensors 2006, EXCO, Daegu, Korea, Oct. 22-25, 2006, pp. 868-871.
Walker et al., "A 128×96 Pixel Event-Driven Phase-DomainΔΣBased Fully Digital 3D Camera in 0.13 μm CMOS Imaging Technology," International Solid State Circuits Conference, Feb. 20, 2011, pp. 410-412.

(Continued)

*Primary Examiner* — Daniel Pihulic
(74) *Attorney, Agent, or Firm* — Slater Matsil, LLP

(57) ABSTRACT

A method of measuring the phase of a response signal relative to a periodic excitation signal, comprises the steps of producing for each cycle of the response signal two transitions synchronized to a clock and framing a reference point of the cycle; swapping the two transitions to confront them in turns to the cycles of the response signal; measuring the offsets of the confronted transitions relative to the respective reference points of the cycles; performing a delta-sigma modulation of the swapping rate of the two transitions based on the successive offsets; and producing a phase measurement based on the duty cycle of the swapping rate.

30 Claims, 4 Drawing Sheets

(56) References Cited

U.S. PATENT DOCUMENTS

| | | |
|---|---|---|
| 7,126,429 B2 | 10/2006 | Mitric |
| 7,319,423 B2 | 1/2008 | Augusto et al. |
| 7,405,812 B1 | 7/2008 | Bamji |
| 7,636,150 B1 | 12/2009 | McCauley et al. |
| 8,390,349 B1 | 3/2013 | Ravi et al. |
| 2004/0233416 A1 | 11/2004 | Doemens et al. |
| 2007/0060079 A1 | 3/2007 | Nakagawa et al. |
| 2007/0075759 A1 | 4/2007 | Metz et al. |
| 2007/0262823 A1 | 11/2007 | Cohen et al. |
| 2008/0024345 A1 | 1/2008 | Watson |
| 2008/0238752 A1 | 10/2008 | Shimizu et al. |
| 2009/0267664 A1 | 10/2009 | Uozumi et al. |
| 2012/0242383 A1 | 9/2012 | Elad et al. |
| 2013/0077082 A1 | 3/2013 | Mellot |
| 2016/0047904 A1* | 2/2016 | Mellot .................. G01S 7/4865 356/5.03 |

OTHER PUBLICATIONS

Raisanen-Ruotsalainen et al., "An Integrated Time-to-Digital Converter with 30-ps. Single-Shot Precision," IEEE Journal of Solid-State Circuits, vol. 35, No. 10, Oct. 2000, pp. 1507-1510.

Chen et al., "A Low-Cost Low-Power CMOS Time-to-Digital Converter Based on Pulse Stretching," IEEE Transactions on Nuclear Science, vol. 53, No. 4, Aug. 2006, pp. 2215-2220.

Niclass et al., "A 128 × 128 Single-Photon Image Sensor With Column-Level 10-Bit Time-to-Digital Converter Array," IEEE Journal of Solid-State Circuits, vol. 43, No. 12, Dec. 2008, pp. 2977-2989.

Roberts et al., "A Brief-Introduction to Time-to-Digital and Digital-to-Time Converters," IEEE Transactions on Circuits and Systems—II: Express Briefs, vol. 57, No. 3, Mar. 2010, pp. 153-157.

Lu et al., "A 3.6 mW, 90 nm CMOS Gated-Vernier Time-to-Digital Converter With an Equivalent Resolution of 3.2 ps," IEEE Journal of Solid-State Circuits, vol. 47, No. 7, Jul. 2012, pp. 1626-1635.

* cited by examiner

METHOD FOR MEASURING A TIME OF FLIGHT

TECHNICAL FIELD

The present disclosure relates to a method for measuring phase of a response signal with respect to a periodic excitation signal, and particularly to measure time of flight of photons.

BACKGROUND

Measuring the time of flight of photons may be used to determine the distance to a target, as disclosed by U.S. Patent Application Publication No. 2013-0077082 to Mellot. The device emits periodic infrared laser flashes toward a target. The photons reflected from the target return to a single photon avalanche diode (SPAD) array. When a SPAD is reached by a photon, it is set in an avalanche mode and produces an electric pulse. The flight time is determined by measuring the delay between the emission of the laser flash and the production of corresponding pulses by the SPAD array. Knowing the speed of light, the distance of the target is deduced from the time of flight.

FIG. 1 is a block diagram of the time of flight measurement circuit described in the '082 patent application. The circuit includes a phase comparator 10 that receives the pulses generated by a SPAD array 12, and a half-wave signal H produced by a variable delay line 14. The delay line 14 produces the signal H by delaying a reference signal Href based on a set point produced by an integrator 16. The integrator 16 receives the output of the phase comparator 10. The circuit thus forms a delay locked loop or DLL.

In practice, the phase comparator 10 and the integrator 16 are formed by a charge pump that charges or discharges a capacitor with the pulses produced by the array 12, depending on whether the pulses occur before or after a transition of the signal H. The circuit is thus configured to place the transition of the signal H so as to equalize the numbers of pulses occurring before and after the transition.

FIG. 2 is a timing diagram illustrating an example of evolution of the signals used by the measuring circuit of FIG. 1, when the loop is locked. An intermittent laser flux is emitted at the rhythm of active phases of a periodic excitation signal LP. A signal SPAD illustrates an example of corresponding response pulse bursts produced by the array 12.

Ideally, the envelope of the response pulse bursts reproduces the excitation signal LP with a lag. In practice, the pulses have a certain probability to comply with the expected envelope, but many photons fail to reach the array, and some arrive outside the expected envelope. As shown, some photons may arrive early because they are reflected by parasitic elements closer than the target, or arrive late after multiple reflections. Such "off limits" pulses may also come from ambient light.

The reference signal Href is a square wave having the same period as the excitation signal LP, whose rising transitions are centered in the flash emission phases. The signal H corresponds, when the loop is locked, to the signal Href delayed such that its rising transitions are centered in the bursts. The delay of signal H relative to signal Href is the sought time of flight ToF, and corresponds to the current set point provided by the integrator 16 to the variable delay line 14. The circuit of FIG. 1 is analog and has many components, such as the variable delay line and the charge pump, which may drift with temperature changes.

SUMMARY

Generally speaking, a method is provided for measuring the phase of a response signal relative to a periodic excitation signal. The method may include producing for each cycle of the response signal two transitions synchronized to a clock and framing a reference point of the cycle; swapping the two transitions to confront them in turns to the cycles of the response signal; measuring the offsets of the confronted transitions relative to the respective reference points of the cycles; performing a delta-sigma modulation of the swapping rate of the two transitions based on the successive offsets; and producing a phase measurement based on the duty cycle of the swapping rate.

DETAILED DESCRIPTION

To avoid drifting of a time of flight measurement circuit, the present disclosure seeks herein to realize the circuit fully digitally. Relatively straightforward digital equivalents to some of the elements of FIG. 1 may be found. However, known digital equivalents of the variable delay line 14 of FIG. 1 may not be satisfactory. Indeed, a digital variable delay line may be formed of a shift-register having a programmable tap. The resolution of the delay is then the period of the clock signal that clocks the shift-register. In a time of flight measurement circuit, it is sought to measure distances with millimeter precision, which requires a resolution of a few picoseconds. The shift register would be clocked at several hundred gigahertz, which may pose difficulties in current technologies.

Figure 1:
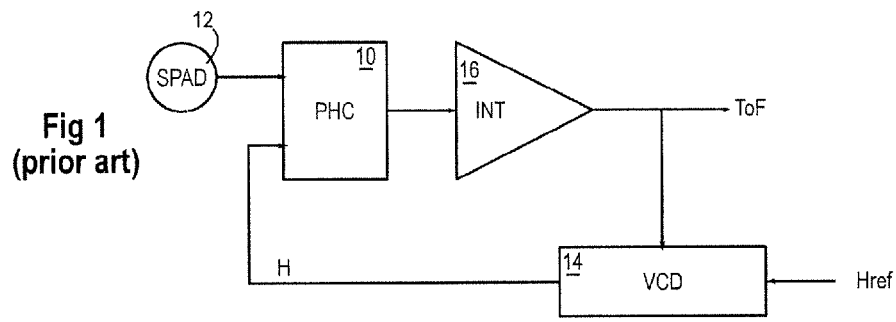
FIG. 1 is a block diagram of a circuit for measuring time of flight, according to the prior art.
Figure 3:
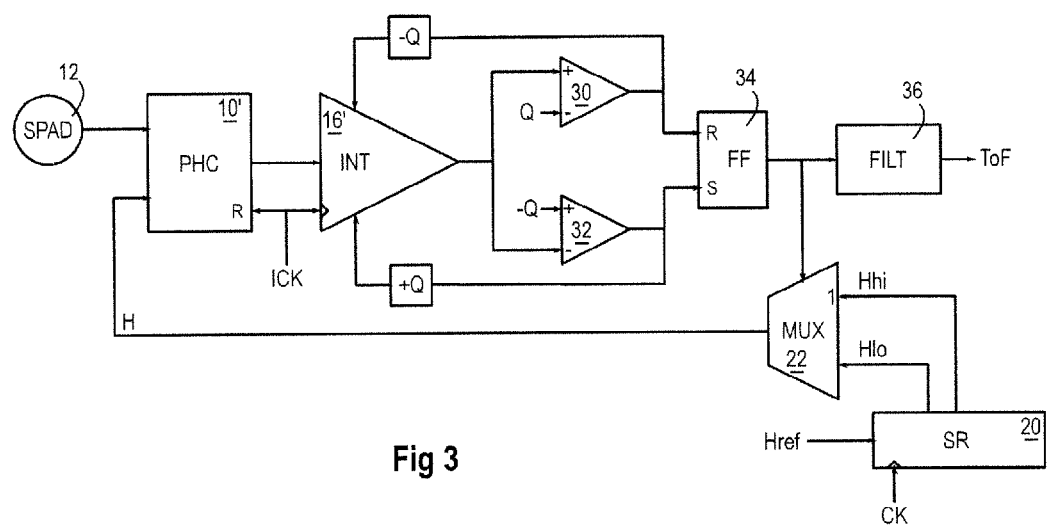
FIG. 3 is a block diagram of an embodiment of a digital circuit for measuring time of flight, according to the present disclosure.

FIG. 3 is a block diagram of a first embodiment of a fully digital circuit for measuring time of flight, capable of reaching a satisfactory resolution using a clock signal with a reasonable frequency. The phase comparator 10 and integrator 16 of FIG. 1 are replaced by direct digital equivalents, designated by 10' and 16'. The integrator 16', in practice, a register configured as an accumulator, is clocked by an integration clock ICK having the same period as the flash emission signal LP. The phase comparator 10' may include two counters, both receiving the pulses from the SPAD array 12. One counter is active when the signal H is low, and the other counter is active when the signal H is high. After each burst of pulses, one of the counters contains the number of pulses occurring before the transition of the signal H, and the other counter contains the number of pulses occurring after the transition. The integrator 16' may then receive the difference between the contents of the counters. The counters are reset at each integration period ICK.

Figure 2:
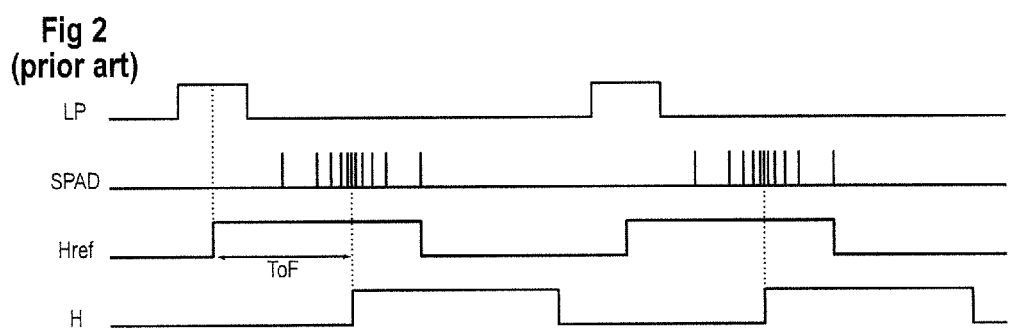
FIG. 2 is a timing diagram illustrating operation of the circuit of FIG. 1.

The half-wave signal H is selected from two rectangular signals Hlo and Hhi of same period as the excitation signal LP, but phase-shifted by a multiple of the period of the system clock, whose frequency is, for example, 5 to 10 times greater than that of the signal LP. An alternation of signals Hlo and Hhi for forming the signal H is performed according to a delta-sigma modulation based on an evolution of the content of the integrator 16'. The signals Hlo and Hhi may be generated by two successive flip-flops of a shift register 20 clocked by the system clock CK and receiving the reference half-wave signal Href (FIG. 2). The selection of the signal H is performed by a multiplexer 22.

To obtain a delta-sigma modulation, the content of the integrator 16' may be compared to a positive threshold Q and a negative threshold −Q using two digital comparators 30 and 32. The outputs of comparators 30 and 32 are connected to an RS-type flip-flop 34 so that the flip-flop is set to 0 when the content of the integrator exceeds Q, and is set to 1 when the content of the integrator is less than −Q. Whenever one of the thresholds Q and −Q is reached by the integrator 16', the signed value of the threshold, or a fraction thereof, is subtracted from the content of the integrator, as shown by feedback lines from the outputs of the comparators 30, 32 to the integrator. The output of flip-flop 34 controls the multiplexer 22 so that a 1 selects the rectangular signal having the highest delay, Hhi.

With this configuration, the duty cycle of the output of flip-flop 34 is indicative of the position of the burst of SPAD pulses relative to one of the signals Hlo and Hhi. In other words, the time of flight ToF is deduced from the duty cycle based on the known delays of signals Hlo and Hhi relative to the reference signal Href. The duty cycle may be extracted by an averaging or a digital 1-bit low-pass filter 36.

Figure 4:
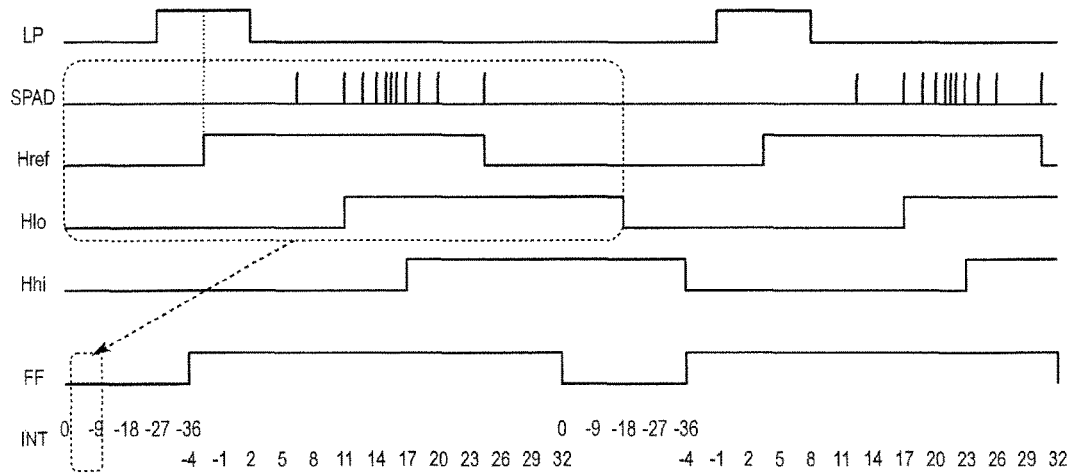
FIG. 4 is a timing diagram illustrating operation of the circuit of FIG. 3.

FIG. 4 is a timing diagram illustrating the operation of the circuit of FIG. 3 in the context of a simplified example. The signals LP, SPAD and Href are the same as those of FIG. 2. The signal H is not shown. Indeed, it coincides with one or the other of the two periodic signals Hlo and Hhi, examples of which are shown.

The SPAD array detects, for example, eleven events per laser flash, producing the SPAD pulses shown in FIG. 4. The rising edge of signal Hhi arrives, for example, at two thirds of the expected envelope of the pulse burst, while the rising edge of signal Hlo arrives at the beginning of the expected envelope. The integration clock ICK is such that the integrator content is updated between two pulse bursts. It may thus be the complement of signal H. The evolution of the state of the latch 34 and of the content of the integrator 16' are represented by signals FF and INT in a compressed time scale. Each transition of the content of the integrator corresponds to the duration of a period of signal LP.

At startup of the circuit, it is assumed that the flip-flop 34, or the signal FF is 0, which selects the signal Hlo as the signal H supplied to the phase comparator 10'. At each burst, the phase comparator 10' counts a single pulse while the signal H (Hlo) is 0, and ten pulses while the signal H is 1, resulting in a difference of −9 supplied to the integrator.

After four periods, the integrator contains −36. If the threshold Q is set equal to 32, the comparator 32 switches to 1, which sets the signal FF to 1, and the threshold Q (32) is added to the content of the integrator (−36). The signal Hhi is now supplied to the phase comparator as signal H, and the integrator starts at −4. At each burst, the phase comparator 10' counts seven pulses while the signal H (Hhi) is 0, and four pulses while the signal H is 1, resulting in a difference of 3 being provided to the integrator.

The integrator reaches 32 at the twelfth burst. The comparator 30 switches to 1, which sets the signal FF to 0, and the threshold Q (32) is subtracted from the content of the integrator (32). The signal Hlo is again supplied to the phase comparator as signal H, and the integrator starts at 0.

The system is in a steady state where the signal FF remains at 1 for twelve periods and 0 during four periods. The duty cycle α of signal FF is equal to $12/(12+4)=0.75$, and the time of flight is provided by:

$$\text{ToF}=\Delta lo+\alpha(\Delta hi-\Delta lo);$$

where Δhi and Δlo are the delays of signals Hhi and Hlo relative to the reference signal Href.

The resolution obtained for the duty cycle α increases with the number of periods used to calculate the average in the filter 36. In the example of FIG. 4, the duty cycle α happens to be equal to a ratio of integer numbers of periods, and its exact value can be provided at the end of one cycle of the signal FF, so that there is no need to calculate an average over more periods. In general, the number of periods fluctuates from one cycle to the other of the signal FF, so that the average value is calculated over a larger number of periods to approach the exact value of the duty cycle more accurately.

To obtain convergence of the duty cycle α to a stable useful value, it is desirable that the transitions of the signals Hlo and Hhi be located on either side of the center of the burst, and be contained within the burst. It follows that the position of each burst should be known approximately in order to select two suitable signals Hlo and Hhi.

Figure 5:
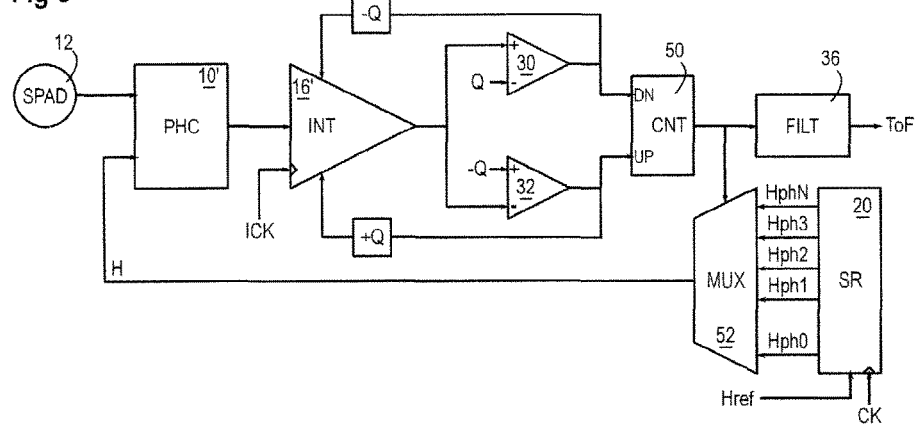
FIG. 5 is a block diagram of another embodiment of a fully digital circuit for measuring time of flight, according to the present disclosure.

FIG. 5 is a block diagram of an embodiment of a time of flight measuring circuit capable of automatically searching for the suitable signals Hlo and Hhi. The flip-flop 34 of FIG. 3 is replaced by an up/down counter 50 whose up-counting input UP receives the output of comparator 32 and the down-counting terminal DN receives the output of comparator 30. A multiplexer 52 is connected to provide as signal H a selected phase Hph (Hph0, Hph1 . . . HphN) of the reference signal Href, assigned to the content of counter 50. The different phases Hph may be provided by successive flip-flops of the shift register 20, the first phase Hph0 being the reference signal Href itself. In this case, the delay of the signal H with respect to the reference signal Href is proportional to the content of the counter 50.

Figure 6:
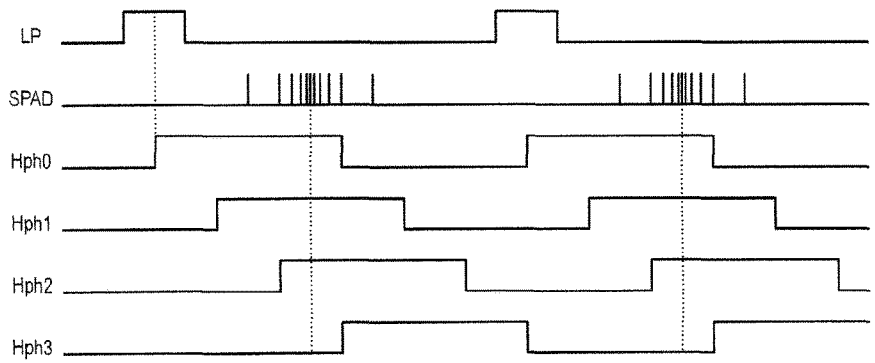
FIG. 6 is a timing diagram illustrating operation of the circuit of FIG. 5.

FIG. 6 is a timing diagram illustrating the operation of the circuit of FIG. 5 in the same context as the example of FIG. 4. This diagram shows the signals LP and SPAD, and the first four phases output from the shift register 20. Initially, the counter 50 is at zero and selects the phase Hph0 as signal H. The phase comparator 10' provides the value −9+2=−7 for each burst. The integrator 16' reaches the value −32, chosen as an example for the threshold −Q, at the fifth period.

The counter 50 is incremented to 1 and the threshold −Q (−32) is subtracted from the content (−35) of the integrator. The counter 50 now selects the phase Hph1 as signal H. This time, the phase comparator provides the value −11 for each burst. The threshold −Q is reached after three periods. The counter 50 is incremented to 2 and selects the phase Hph2 as signal H. The phase comparator provides the value 1−10=−9 for each burst. The content of the integrator decreases and again ends by reaching the threshold −Q.

The counter 50 is incremented to 3 and selects the phase Hph3 as signal H. The phase comparator provides the value 9−2=7 for each burst. This time, the content of the integrator increases and eventually reaches the positive threshold Q. The counter 50 is decremented to 2.

From this configuration, the signal H oscillates between the phases Hph2 and Hph3 with a duty cycle α corresponding to the position of the center of the burst relative to the transitions of phases Hph2 and Hph3. More specifically, in the case where the phase Hph0 coincides with the reference signal Href, the delay of the pulse burst is equal to the average of the contents of counter 50 multiplied by a period of the clock signal CK.

In practice, a time of flight measurement device includes a light source having a narrow or monochromatic spectrum in the infrared (laser diode), and the SPAD array lies behind a filter having a corresponding narrow spectrum, so that the array is protected from ambient light disturbance. Despite these measures, particularly when ambient light is intense and has a broad spectrum, the SPAD array receives photons at any time that produce pulses uniformly distributed over each integration period.

This would not be an issue if the half-wave signal H were perfectly symmetrical and the phase comparator 10' could be reset instantly, i.e. without missing the first pulses that would occur in the new period. In this case, the pulses due to ambient light that occur before and after the transitions of the signal H compensate each other. In practice, this does not occur, whereby the ambient light may cause a drift of the integrator.

Figure 7:
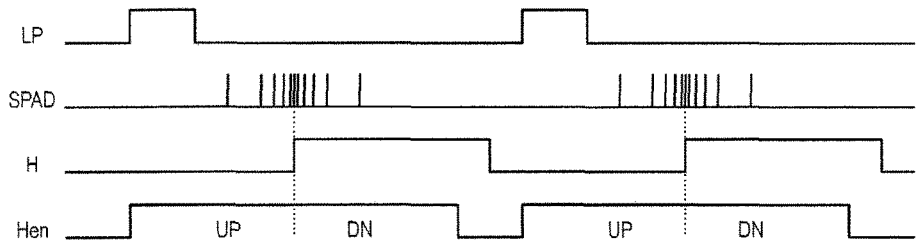
FIG. 7 is a timing diagram illustrating operation of another embodiment of the measuring circuit of FIG. 5.

FIG. 7 is a timing diagram illustrating an alternative operation of the circuit of FIG. 5 to reduce drift caused by switching delays of the elements of the time of flight measuring circuit. The half-wave signal H is associated with an enable signal Hen, defining a window around the transition of signal H, in which pulses can be counted by the phase comparator 10'. Outside the window, the pulse counting is disabled. The width of the window may be symmetrical and, as shown, such that the counting of pulses is disabled in a margin around the reset event of the phase comparator. The reset event is defined by the falling edge of the signal H.

However, it may be difficult to ensure perfect symmetry of the counting window. The window may have a constant offset to one side of the transition of the signal H, such that in a high ambient light situation, the phase comparator still counts more pulses from one side of the transition than the other.

Figure 8:
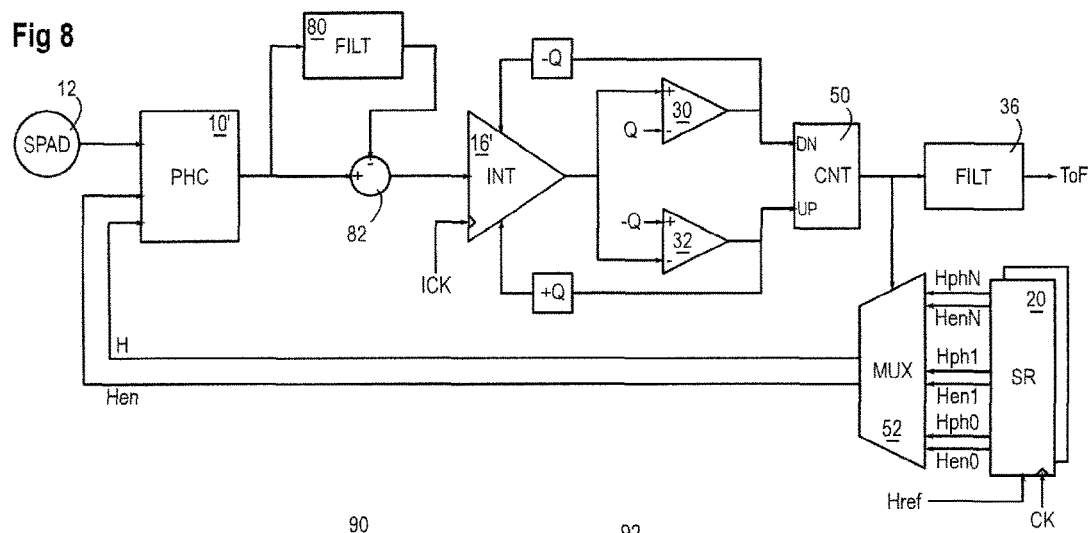
FIG. 8 is a block diagram of another embodiment of a digital circuit for measuring time of flight, according to the present disclosure.

FIG. 8 is a block diagram of a measuring circuit implementing count windows and an offset compensation due to a lack of symmetry of the count windows. The phase comparator 10' is designed to receive, together with the half-wave signal H, an associated count enable signal Hen. The signal Hen, as shown, may be produced by delaying a reference signal through a shift register and by selecting the corresponding flip-flop of the register using the multiplexer 52. When the signal Hen is inactive, the phase comparator does not count the pulses produced by the array 12. A low-pass filter 80 receives the successive differences produced by the phase comparator 10'.

In a locked system having a perfectly symmetrical count window, there is on average the same number of pulses in each half of the count window, i.e. the average value of the differences provided by the phase comparator 10' is zero. If the count window is asymmetric, the average value tends to an offset representative of the difference in width of the two halves of the count window. This average value, produced by the filter 80, may be subtracted at 82 from the differences produced by the phase comparator to the input of the integrator 16'.

Normally, the count window Hen is set to mask the transient phases of the phase comparator 10'. However, it may also be used to improve the sensitivity of the circuit under high ambient light conditions. Under such conditions, photons may be received by the array 12 uniformly over the entire duration of the count window, hiding the pulses concentrated in the center of the window corresponding to the photons reflected from the target whose distance is to be measured. In a locked system, a large count window is not useful—a width approaching the flash emission duration may be sufficient. The full width of the count window is only useful when the target moves rapidly or during a locking phase on a new target.

To compensate for the ambient light, the system may go through a calibration phase. During this phase, no laser flash is emitted and the circuit is configured to measure the average number of pulses per integration period. This average value is preferably calculated over all the pulses produced by the array, i.e. without limitation to the count window. A narrowing of the count window is then operated on the basis of the measured average value. The narrowing may be proportional to the average value and clipped to the duration of a laser flash emission. According to an alternative, the narrowing may be operated stepwise by setting thresholds for the average value.

The number of photons reflected by the target and reaching the array 12 depends on the distance of the target and the reflectivity thereof. When the target is near or has a high reflectivity, the array produces a high number of pulses per burst, so that the differences produced by the phase comparator 10' are also high during a locking phase. This means that thresholds Q and −Q are reached faster than when the target is remote or has a low reflectivity.

Figure 9:
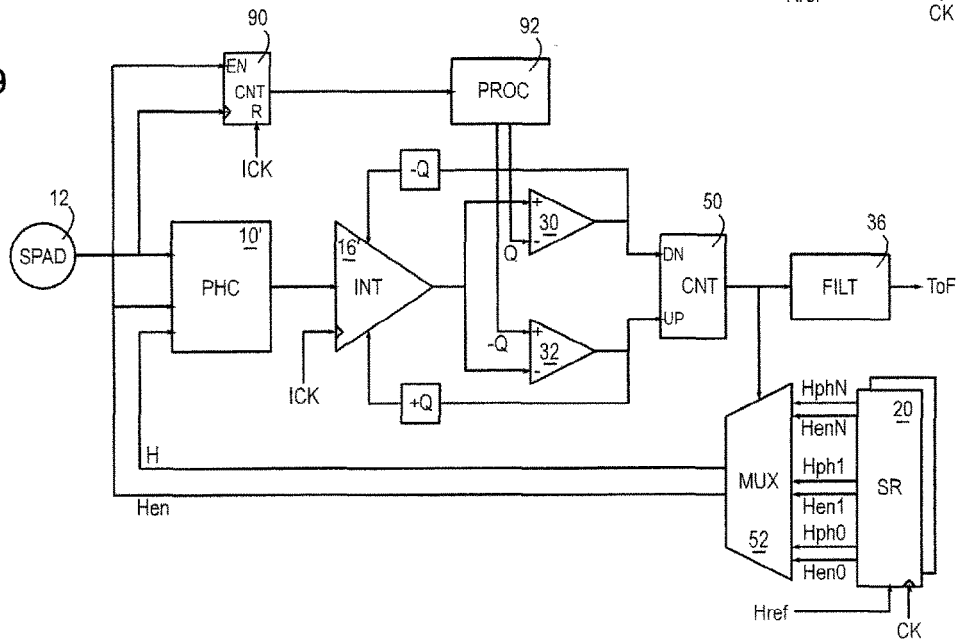
FIG. 9 is a block diagram of another embodiment of a digital circuit for measuring time of flight, according to the present disclosure.

FIG. 9 is a block diagram of an embodiment of a measuring circuit including a device adapting to the average number of pulses per integration period taken into account by the phase comparator. The average number of pulses may be determined using a counter 90 connected to count pulses occurring during the count windows Hen. Thus, the count input of the counter 90 receives the output of the array 12, and the enable input receives the signal Hen. The counter 90 is reset at the pace of the integration clock ICK while a processing circuit 92 takes into account the counter content to evaluate an average number of pulses.

The processing circuit 92 may be configured to adjust the thresholds Q and −Q proportionally to the evaluated average. The thresholds Q and −Q may alternatively be set by increments associated with step values for the average. Unlike the technique of ambient light compensation, which acts on the width of the count window Hen, this technique for adapting the thresholds evaluates the average of the pulses occurring within the counting windows. It is applicable when the width of the count windows has been changed to reflect ambient light.

Many variations and modifications of the embodiments described herein will be apparent to the skilled person. Techniques have been disclosed for measuring the phase of a series of bursts of pulses in the context of a time of flight measurement to determine a distance. These techniques are generally applicable to any situation requiring the knowledge of the position of a burst of pulses with respect to a reference signal.

The disclosed delta-sigma modulation is of the first order, i.e. it uses a single integrator. A delta-sigma modulation of higher order may be used, for example, with two consecutive integrators, which causes the thresholds Q, −Q to be reached faster when the number of pulses per burst is low—in practice, with a 12×12 SPAD array and an infrared laser diode as a light source. The average number of photons per illumination pulse may be of the order of five. With two integrators, the value of threshold Q may be larger, for example, of the order of 1024 where a value of 32 or 64 was applied with a single integrator.

The threshold subtraction that takes place every time the threshold is reached may then be distributed over the two integrators according to variable proportions providing a degree of freedom for optimization. For example, with Q=1024, the proportions $\frac{1}{128}$ and 1 may be applied for the first and second integrators, respectively.

The delta-sigma modulation techniques described above are applicable to other methods for measuring time of flight, and more generally to measuring the phase of a response signal relative to a periodic excitation signal.

Figure 10:
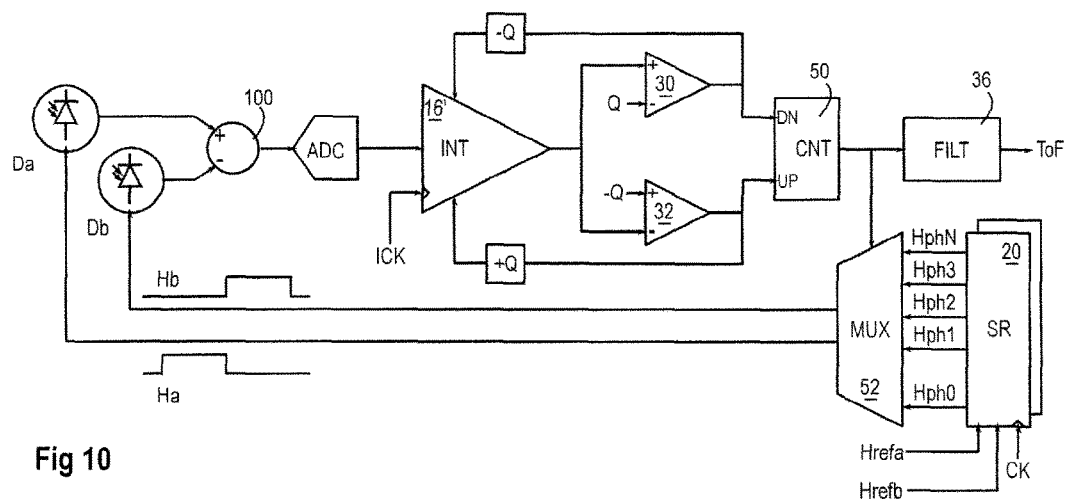
FIG. 10 is a block diagram of an embodiment of a time of flight measuring circuit usable with a depth map camera.

FIG. 10 is a block diagram of an embodiment of a time of flight measurement circuit based on a depth map image sensor. Each pixel of a depth map sensor comprises two photodiodes Da, Db that can be controlled independently.

In the context of a conventional depth map acquisition, an infrared light source illuminates the scene intermittently, such as at the rate of the excitation signal LP of FIG. 2. The two photodiodes Da and Db are controlled by respective signals Ha and Hb to integrate in turn the infrared light reflected by the scene. A subtractor 100 produces the difference of the integration values of the two photodiodes. The successive differences are exploited by a feedback loop designed to adjust the position of the integration intervals Ha, Hb so as to make the difference minimal. Thus, in steady state, the transition of the integration phase between the two photodiodes occurs in principle in the center of each infrared flash received in response to the excitation signal, so that each photodiode integrates the same amount of light energy.

A conventional feedback loop is analog and similar to that of FIG. 1, wherein the half-wave signal H is replaced by the two signals Ha and Hb determining the integration intervals of the two photodiodes.

To achieve a fully digital loop, the above described delta-sigma modulation techniques may also be implemented. The circuit of FIG. 10 can then be based on that of FIG. 5 and its derivatives. The digital integrator 16 of FIG. 5 then receives the differences generated by the subtractor 100 through an analog-to-digital converter ADC.

Instead of providing a single half-wave signal H, the multiplexer 52 is configured to provide both integration controls Ha and Hb for the respective photodiodes Da and Db, for example from two shift registers 20 that respectively receive two reference integration signals Hrefa and Hrefb. As shown, the signals Ha and Hb have complementary active phases of same duration determining the integration intervals of photodiodes Da and Db respectively. The sum of the integration intervals is preferably greater than, or equal to the pulse width of the excitation signal.

In steady state, the system simultaneously modulates the position of signals Ha and Hb like the system of FIG. 5 modulates the position of signal H, such that the average position of the transition of the integration phases (the falling edge of signal Ha and the rising edge of signal Hb) is at the center of the received infrared flashes. As in the case of FIG. 5, the flight time corresponds to the average of the contents of counter 50.

FIGS. 5 and 10 illustrate two different ways of handling a similar type of optical feedback signal using delta-sigma modulation. In the case of a SPAD array (FIG. 5), the optical feedback signal is converted intermediately into bursts of electrical pulses. In the case of a depth map sensor (FIG. 10), the optical feedback signal is intermediately converted into electric charge distributed over two photodiodes Da and Db.

To reduce power consumption of a time of flight measurement system, it may be desired to reduce the width of the pulses of the excitation signal LP. If the width of these pulses is too small, the accuracy of the delta-sigma modulation may be affected. In practice, the accuracy is satisfactory as long as both transitions of the signal H (or of signals Ha, Hb) are contained at any time, in steady state, within the envelope of the expected return light flash. In a limit case, corresponding to a duty ratio of 0% or 100%, one of the transitions is in the center, while the other transition occurs before or after, depending on the duty cycle value. The duration between the two modulated transitions being for example one clock period CK, the minimum desirable length of the excitation pulses is two clock periods.

It is in practice difficult to design a circuit to guarantee an accurate minimum duration of the light flashes. Thus, the circuit would be designed conventionally by adding a relatively large safety margin to the targeted minimum duration of the light flashes, which limits the achievable reduction in power consumption.

Figure 11:
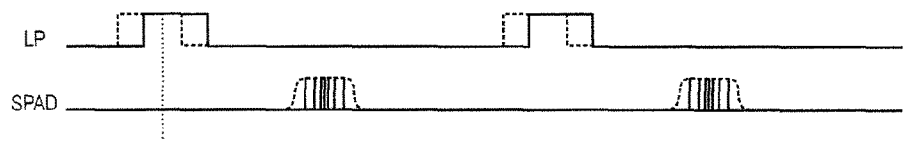
FIG. 11 is a timing diagram illustrating an application of dithering to the excitation signal.

FIG. 11 is a timing diagram illustrating a technique that may reduce or even eliminate the safety margin. The circuit may be designed to produce light flashes having a typical width of two clock periods without safety margin, or with a low safety margin. The resulting circuit, taking account of temperature variations and manufacturing parameters, may in the worst case produce light flashes having a width less than two clock periods. To make the accuracy of the delta-sigma modulation satisfactory, it is proposed to apply dithering to the position of the excitation pulses.

As shown in FIG. 11, the position of the excitation pulses LP oscillates from one pulse to the next, within a range defined around a nominal position. This oscillation causes on average a spreading of the light energy at the edges of the received light flashes, as shown by dotted lines in the SPAD signal. In other words, due to the averaging effect, the received light flashes appear wider than the actual width of the excitation pulses. If the excitation pulses are too narrow, the spread edges may still widen the received flashes enough by averaging effect.

The position dithering may be performed by applying to each pulse LP a different delay selected from a set of discrete values. The delays may be selected so that they first increase and then decrease. Preferably the dithering is random, i.e. the applied delay is selected randomly in the set of discrete values, which has the effect of attenuating high frequency components of the excitation signal and spreading the average energy of the edges of the received flashes according to a Gaussian.

Figure 12:
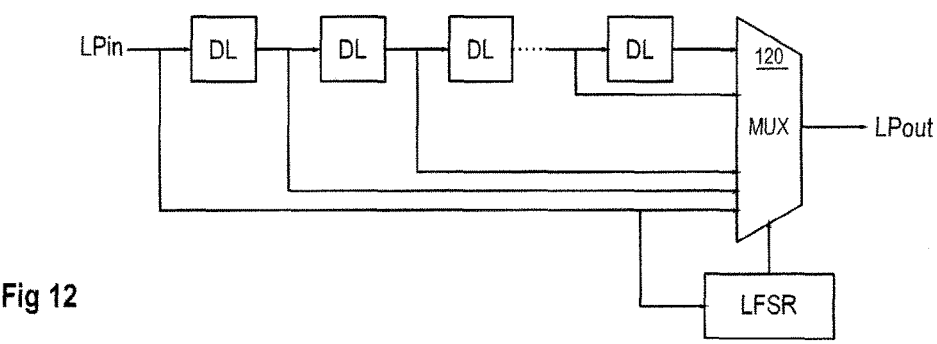
FIG. 12 is a block diagram of a dithering circuit usable in a time of flight measuring circuit.

FIG. 12 is a block diagram of an exemplary dithering circuit. A reference excitation signal LPin is provided to a series of similar delay cells DL connected in cascade. The output of each delay cell is connected to a respective input of a multiplexer 120. The signal LPin is also supplied to an input of the multiplexer. The output of the multiplexer 120 provides the dithered excitation signal LPout to use for producing the light flashes. The input of the multiplexer to be provided as signal LPout may be selected by a pseudo-random number that is recalculated for each pulse of signal LPin. The pseudo-random number may be provided by a linear feedback shift register LFSR clocked by the signal LPin.

The largest delay, i.e. the sum of the delays of the cells DL, may be selected to meet the safety margin that would be applied to the excitation pulses in a conventional circuit. Each delay cell DL may comprise an even number of inverters connected in cascade.

That which is claimed is:

1. A method of measuring phase of a series of bursts of pulses relative to a periodic generator signal, the method comprising:
    generating first and second rectangular signals having a same period as the periodic generator signal and being phase shifted so as to position respective transitions before and after a center of a current burst of pulses;
    swapping application of the first and second rectangular signals to the bursts of pulses;
    determining a difference in a number of pulses occurring in the current burst of pulses before and after the respective transition of an applied rectangular signal;
    performing a delta-sigma modulation on a swapping rate of the first and second rectangular signals based on successive differences in the series of bursts of pulses; and
    generating a phase measurement based on a duty cycle of the swapping rate.

2. The method of claim 1 further comprising:
    integrating the successive differences;
    swapping the first and second rectangular signals when an integral value reaches a threshold value; and
    resuming the integrating after subtracting at least a fraction of the threshold value from the integral value.

3. The method of claim 1 further comprising:
    generating a set of rectangular signals, the set of rectangular signals being phase shifted from each other by a constant value;
    using a counter as an index to select a rectangular signal in the set of rectangular signals to apply the selected rectangular signal to the bursts of pulses;
    integrating the successive differences;
    if an integral value reaches a positive threshold value, decrementing the counter and resuming the integrating after subtracting at least a fraction of the positive threshold from the integral value;
    if the integral value reaches a negative threshold, incrementing the counter and resuming the integrating after subtracting at least a fraction of the negative threshold from the integral value; and
    generating the phase measurement based on an average value of the counter.

4. The method of claim 1 further comprising:
    generating a count window centered on the respective transition of the applied rectangular signal, the count window having a width less than a period of the periodic generator signal; and
    using only pulses within the counting window for determining the difference in the numbers of pulses occurring in the current burst of pulses before and after the respective transition of an applied rectangular signal.

5. The method of claim 4 further comprising:
    determining an average of the successive differences; and
    applying a correction to the successive differences based on the average.

6. The method of claim 2 further comprising:
    determining an average number of pulses per period of the periodic generator signal; and
    adjusting the threshold value based on the average number of pulses.

7. The method of claim 4 further comprising:
    emitting light at a rate of the periodic generator signal;
    generating the bursts of pulses from a single-photon avalanche diode (SPAD) array configured to receive light reflected from a target; and
    determining a distance to the target based on the phase measurement.

8. The method of claim 7 further comprising, during a calibration phase in an absence of light emission:
    determining an average number of pulses per period of the periodic generator signal; and
    narrowing the count window based on the average number of pulses.

9. The method of claim 1 further comprising:
    conducting first and second consecutive integrations of the successive differences;
    swapping the first and second rectangular signals when a second integral value reaches a threshold value;
    subtracting a first fraction of the threshold value from a first integral value;
    subtracting a second fraction of the threshold value, greater than the first fraction, from the second integral value; and
    resuming integrating.

10. A method of measuring a distance to a target by measuring phase of a series of bursts of pulses relative to a periodic generator signal, the method comprising:
    emitting light at the target and at a rate of the periodic generator signal;
    receiving the bursts of pulses from a single-photon avalanche diode (SPAD) array configured to receive light reflected from the target;
    generating first and second rectangular signals having a same period as the periodic generator signal and being phase shifted so as to position respective transitions before and after a center of a current burst of pulses;
    swapping application of the first and second rectangular signals to the bursts of pulses;
    determining a difference in a number of pulses occurring in the current burst of pulses before and after the respective transition of an applied rectangular signal;
    performing a delta-sigma modulation on a swapping rate of the first and second rectangular signals based on successive differences in the series of bursts of pulses; and
    generating a phase measurement based on a duty cycle of the swapping rate, and determining the distance to the target based on the phase measurement.

11. The method of claim 10 further comprising:
    integrating the successive differences;
    swapping the first and second rectangular signals when an integral value reaches a threshold value; and
    resuming the integrating after subtracting at least a fraction of the threshold value from the integral value.

12. The method of claim 10 further comprising:
    generating a set of rectangular signals, the set of rectangular signals being phase shifted from each other by a constant value;

using a counter as an index to select a rectangular signal in the set of rectangular signals to apply the selected rectangular signal to the bursts of pulses;
integrating the successive differences;
if an integral value reaches a positive threshold value, decrementing the counter and resuming the integrating after subtracting at least a fraction of the positive threshold from the integral value;
if the integral value reaches a negative threshold, incrementing the counter and resuming the integrating after subtracting at least a fraction of the negative threshold from the integral value; and
generating the phase measurement based on an average value of the counter.

13. The method of claim 10 further comprising:
generating a count window centered on the respective transition of the applied rectangular signal, the count window having a width less than a period of the periodic generator signal; and
using only pulses within the counting window for determining the difference in the numbers of pulses occurring in the current burst of pulses before and after the respective transition of an applied rectangular signal.

14. The method of claim 13 further comprising:
determining an average of the successive differences; and
applying a correction to the successive differences based on the average.

15. The method of claim 11 further comprising:
determining an average number of pulses per period of the periodic generator signal; and
adjusting the threshold value based on the average number of pulses.

16. A digital circuit for measuring phase of a series of bursts of pulses relative to a periodic generator signal, the digital circuit comprising:
a shift register configured to generate first and second rectangular signals having a same period as the periodic generator signal and being phase shifted so as to position respective transitions before and after a center of a current burst of pulses;
a multiplexer configured to swap application of the first and second rectangular signals to the bursts of pulses;
a phase comparator configured to determine a difference in a number of pulses occurring in the current burst of pulses before and after the respective transition of an applied rectangular signal;
an integrator configured to perform a delta-sigma modulation on a swapping rate of the first and second rectangular signals based on successive differences in the series of bursts of pulses; and
a circuit configured to generate a phase measurement based on a duty cycle of the swapping rate.

17. The digital circuit of claim 16 wherein said integrator is configured to integrate the successive differences; wherein said multiplexer is configured to swap the first and second rectangular signals when an integral value reaches a threshold value; and wherein said integrator is configured to resume integrating after subtracting at least a fraction of the threshold value from the integral value.

18. The digital circuit of claim 16 wherein said shift register is configured to generate a set of rectangular signals, the set of rectangular signals being phase shifted from each other by a constant value; further comprising a counter configured to select a rectangular signal in the set of rectangular signals to apply the selected rectangular signal to the bursts of pulses; wherein said integrator is configured to integrate the successive differences; wherein if an integral value reaches a positive threshold value, said counter is configured to decrement, and said integrator is configured to resume integrating after subtracting at least a fraction of the positive threshold from the integral value; if the integral value reaches a negative threshold, said counter is configured to increment, and said integrator is configured to resume integrating after subtracting at least a fraction of the negative threshold from the integral value; and wherein said circuit is configured to generate the phase measurement based on an average value of said counter.

19. The digital circuit of claim 16 further comprising a processor configured to generate a count window centered on the respective transition of the applied rectangular signal, the count window having a width less than a period of the periodic generator signal; and wherein said phase comparator is configured to use only pulses within the counting window for determining the difference in the numbers of pulses occurring in the current burst of pulses before and after the respective transition of an applied rectangular signal.

20. The digital circuit of claim 16 further comprising:
an optical source configured to emit light at a rate of the periodic generator signal;
a single-photon avalanche diode (SPAD) array configured to generate the bursts of pulses from received light reflected from a target; and wherein said circuit is configured to determine a distance to the target based on a phase measurement.

21. A method of measuring phase of a response signal relative to a periodic excitation signal, the method comprising:
producing for each cycle of the response signal two transitions synchronized to a clock signal and framing a reference point of each cycle;
swapping the two transitions to confront them in turns to cycles of the response signal;
measuring offsets of the two confronted transitions relative to respective reference points of the cycles;
performing a delta-sigma modulation of a swapping rate of the two confronted transitions based on successive offsets; and
producing a phase measurement based on a duty cycle of the swapping rate.

22. The method of claim 21 further comprising:
acquiring a burst of pulses in each cycle of the response signal; and
producing, as a measure of the offsets, a difference of a numbers of pulses occurring in a current burst before and after a transition confronted to the cycle.

23. The method of claim 22 further comprising:
integrating successive differences;
swapping the two transitions when an integral value reaches a threshold value; and
resuming the integrating after subtracting at least a fraction of the threshold value from the integral value.

24. The method of claim 23 further comprising:
generating a set of transitions, the set of transitions being phase shifted from each other by the clock signal;
using a counter as an index to select a transition in the set of transitions to apply the selected transition to the bursts of pulses;
integrating the successive differences;
if an integral value reaches a positive threshold value, modifying the counter in a first direction and resuming the integrating after subtracting at least a fraction of the positive threshold from the integral value;

if the integral value reaches a negative threshold, modifying the counter in a second direction and resuming the integrating after subtracting at least a fraction of the negative threshold from the integral value; and generating the phase measurement based on an average value of the counter.

25. The method of claim 22 further comprising:

generating a count window centered on the respective transition of the applied transition, the count window having a width less than a period of the excitation signal; and using only pulses within the counting window for determining the difference in the numbers of pulses occurring in the current burst of pulses before and after the respective transition of an applied transition.

26. The method of claim 25 further comprising:

determining an average of the successive differences; and applying a correction to the successive differences based on the average.

27. The method of claim 23 further comprising:

determining an average number of pulses per period of the excitation signal; and adjusting the threshold value based on the average number of pulses.

28. The method of claim 25 further comprising:

emitting light at a rate of the excitation signal;

generating the bursts of pulses from a single-photon avalanche diode (SPAD) array configured to receive light reflected from a target; and determining a distance to the target based on the phase measurement.

29. The method of claim 28 further comprising, during a calibration phase in an absence of light emission:

determining an average number of pulses per period of the excitation signal; and narrowing the count window based on the average number of pulses.

30. The method of claim 23 further comprising:

conducting first and second consecutive integrations of the successive differences;

swapping the two transitions when a second integral value reaches a threshold value;

subtracting a first fraction of the threshold value from a first integral value;

subtracting a second fraction of the threshold value, greater than the first fraction, from the second integral value; and resuming integrating.

* * * * *